US012774986B2

(12) United States Patent
Hull et al.

(10) Patent No.: US 12,774,986 B2
(45) Date of Patent: Oct. 27, 2026

(54) SYSTEMS, METHODS, AND APPARATUS FOR DETERMINING AC LOSSES IN SUPERCONDUCTORS

(71) Applicants: The Boeing Company, Arlington, VA (US); Commonwealth Scientific and Industrial Research Organisation

(72) Inventors: John Hull, Arlington, VA (US); Ning Zhang, Arlington, VA (US)

(73) Assignee: The Boeing Company, Arlington, VA (US)

( * ) Notice: Subject to any disclaimer, the term of this patent is extended or adjusted under 35 U.S.C. 154(b) by 399 days.

(21) Appl. No.: 18/351,091

(22) Filed: Jul. 12, 2023

(65) Prior Publication Data

US 2025/0020614 A1 Jan. 16, 2025

(51) Int. Cl.
*G01N 27/72* (2006.01)
*G01N 1/42* (2006.01)

(52) U.S. Cl.
CPC ............... *G01N 27/72* (2013.01); *G01N 1/42* (2013.01)

(58) Field of Classification Search
None
See application file for complete search history.

(56) References Cited

U.S. PATENT DOCUMENTS 5,059,903 A * 10/1991 Otaka .................... G01N 17/00 324/202
5,111,140 A * 5/1992 Takahata ............ G01R 33/1238 324/228
2008/0169805 A1* 7/2008 Cho .................. G01R 33/1223 324/201
2012/0275486 A1* 11/2012 Bahr ...................... G01N 25/16 374/55
2019/0039034 A1* 2/2019 Siow ....................... B01F 31/27

OTHER PUBLICATIONS

Probir K. Ghoshal et al.; Experimental Set Up to Measure AC Losses of HTS in Rotating Magnetic Field; IEEE Transactions on Applied Superconductivity, vol. 17, No. 2, Jun. 2007; pp. 3199-3202 (Year: 2007).*
Lovatt et al., "High-accuracy iron-loss measurements on motor stator stacks", 2015 IEEE, downloaded on Jul. 11, 2023, p. 1370.

* cited by examiner

*Primary Examiner* — Nasima Monsur
(74) *Attorney, Agent, or Firm* — Harrity & Harrity, LLP

(57) ABSTRACT

An apparatus for determining alternating current (AC) losses in a superconductor sample may comprise a sample holder configured to hold the superconductor sample and a frame configured to support the sample holder. The frame may include a pair of spaced apart parallel walls and may be configured to rotate about an axis of rotation. The apparatus may also comprise a rotor positioned between the pair of spaced apart parallel walls of the frame. The rotor may be configured to rotate about the axis of rotation to generate a magnetic field. The apparatus may comprise an extension arm coupled to the frame and a sensor device configured to detect a force exerted on the sensor device by the extension arm.

20 Claims, 8 Drawing Sheets

| Sample Number | Sample 1 | Sample 2 |
|---|---|---|
| Tape model | Theva TPL1100 | Theva TPL4600 |
| GdBCO thickness | 3 um | 3 um |
| GdBCO Critical current density (77k) | 1 MA/cm²* | 1 MA/cm²* |
| Tape width | 12mm | 6 mm |
| Tape length | 90 mm | 70 mm |

*Calculate from the engineering critical current provided by the vendor

SYSTEMS, METHODS, AND APPARATUS FOR DETERMINING AC LOSSES IN SUPERCONDUCTORS

FIELD

The present disclosure relates generally to measurement apparatus, and more particularly to apparatus for determining alternating current (AC) losses of superconductors.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Superconductor motors and generators are considered one of the key technologies for large all-electric or turboelectric aircraft since they have the potential to provide significant environmental and economic benefits. However, achieving low AC losses in armature windings caused by AC magnetic fields remain a major obstacle in the development of fully superconductor motors and generators. The AC losses can be categorized into two types: magnetization loss, which is a loss when an external magnetic field changes, and conduction loss caused by a change in current.

Traditional methods of measuring AC losses can be generally divided into three categories: electrical, magnetic, and calorimetric methods, each of which has its advantages and drawbacks. The magnetic method may measure the change in the magnetic moment of a high-temperature superconductor (HTS) sample magnetized by an external AC magnetic field. This method can be performed by either measuring the hysteresis loop or the AC susceptibility. For the hysteresis loop measurement, the magnetic field is varied very slowly. Therefore, the magnetic method may not capture the frequency-dependent behavior of the AC loss types such as the eddy current loss and the coupling loss. The AC susceptibility measurement requires exposing the HTS sample to a strong, uniform DC field on which a small AC field is superimposed. However, this measurement method may not be suitable for armature windings because the magnetic field may not represent the typical AC magnetic field induced in an electric machine.

The electrical method for measuring AC losses in HTS sample typically utilizes the combination of a pick-up coil and a compensation coil. The pick-up coil may be used to measure the magnetic moment induced in the HTS sample as well as the external magnetic field. The compensation coil may be used to cancel the signal due to the external magnetic field in the pick-up coil. However, this method may require geometrical correction for different arrangements of the pick-up coil and the HTS sample, making it difficult to use. Other electrical methods may measure AC transport current loss rather than AC losses due to an external AC field.

The calorimetric method for measuring AC losses in HTS sample typically relies on measuring the temperature rise of the HTS sample using different temperature sensors or the amount of evaporation of cryogen as a result of the heat generated due to the AC losses. The calorimetric method may measure the AC losses due to the external field and transport current loss at the same time. The calorimetric method based on gas flow may be applied to complicated HTS samples such as coils and even machines. However, the calorimetric method may require repetitive, and often empirical calibration processes to establish a correlation between the temperature rise/gas flow and the rate of heat generation, making them difficult to implement. Therefore, there is a need for a relatively simple, fast, and easy method for measuring AC losses in high-temperature superconductors (HTS) samples.

SUMMARY

The present application is directed to embodiments that relate to systems, methods, and apparatus for determining AC losses in high-temperature superconductor (HTS) samples or structures. The embodiments may calculate AC losses in HTS samples having various shapes and/or complex structures, such as superconductor wires, strips, cables, tapes, coils, and other superconductor materials and devices. The embodiments may measure the dragging force (e.g., torque) induced on the HTS samples caused by a magnetic field. The dragging force measurement may be used by the embodiments for determining the AC losses in the HTS samples. The embodiments are relatively easy to implement and can enable relatively fast, accurate, and reliable AC loss measurement determinations for HTS samples. Further, the embodiments can aid in the development of new and/or improved superconductor coil designs that minimize AC losses in superconductor machines, such as motors and generators.

In one aspect, an apparatus for determining alternating current (AC) losses in a superconductor sample is disclosed. The apparatus may comprise a sample holder configured to hold the superconductor sample and a frame configured to support the sample holder. The frame may include a pair of spaced apart parallel walls and may be configured to rotate about an axis of rotation. The apparatus may also comprise a rotor positioned between the pair of spaced apart parallel walls of the frame. The rotor may be configured to rotate about the axis of rotation to generate a magnetic field. Further, the apparatus may comprise an extension arm coupled to the frame and a sensor device configured to detect a force exerted on the sensor device by the extension arm.

In another aspect, an apparatus for determining alternating current (AC) losses in a superconductor sample is disclosed. The apparatus may comprise a sample holder configured to hold the superconductor sample and a rail assembly including movable member mounted on a rail member, wherein the movable element is configured to be coupled to the sample holder and to move in a linear direction along the rail member. The apparatus may also comprise a rotor positioned in close proximity to the superconductor sample, wherein rotor is configured to rotate about the axis of rotation to generate a magnetic field. Further, the apparatus may comprise a sensor device configured to detect a force exerted on the sensor device by the sample holder.

In a further aspect, a method for determining alternating current (AC) losses in a superconductor sample is disclosed. The method may comprise providing the superconductor sample in sample holder, wherein the sample holder is coupled to a movable support assembly. The method may also comprise controlling a motor to generate a force on the superconductor sample to attempt to cause the support assembly to move in a first direction, measuring a force exerted on a sensor device based on the attempted movement of the support member, and determining the AC losses for the superconductor sample based on the measured force.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE DRAWINGS

A more complete understanding of embodiments of the present application may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
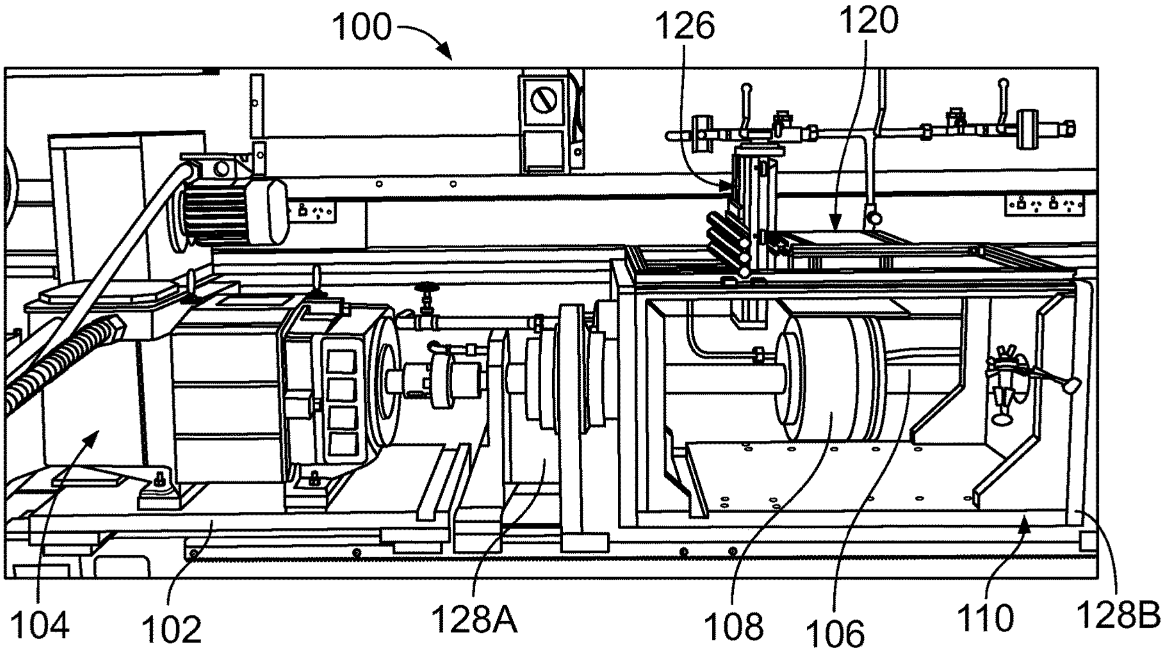
FIG. 1 illustrates a front view of a measurement apparatus for determining AC losses in superconductor samples, according to an exemplary embodiment.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features may be designated by common reference numbers throughout the drawings. In some drawings, multiple instances of a particular type of feature may be used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, sides are illustrated and associated with reference number 128. When referring to a particular one of the sides, such as the side 128A, the distinguishing letter "A" may be used. However, when referring to any arbitrary one of the sides or to the sides as a group, the reference number 128 may be used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Referring now to the drawings, and more particularly to FIG. 1, an exemplary embodiment of a measurement apparatus or system 100 is shown. The measurement apparatus 100 may be used to determine AC losses in high temperature superconductor (HTS) samples or structures. The measurement apparatus 100 may be used to calculate AC losses in HTS samples having various shapes and/or complex structures, such as superconductor wires, strips, films, conductors, cables, tapes, coils, and other superconductor materials and devices. The measurement apparatus 100 may measure the dragging force (e.g., torque) induced on the HTS samples by a magnetic field. The measurement apparatus 100 may use the dragging force measurement for determining the AC losses in the HTS samples. The measurement apparatus 100 may be relatively easy to use and can enable fast, accurate, and reliable AC loss measurement determinations for the HTS samples. Further, the measurement apparatus 100 can aid in the development of new and/or improved superconductor coil designs that minimize AC losses in superconductor machines, such as motors and generators.

Figure 2:
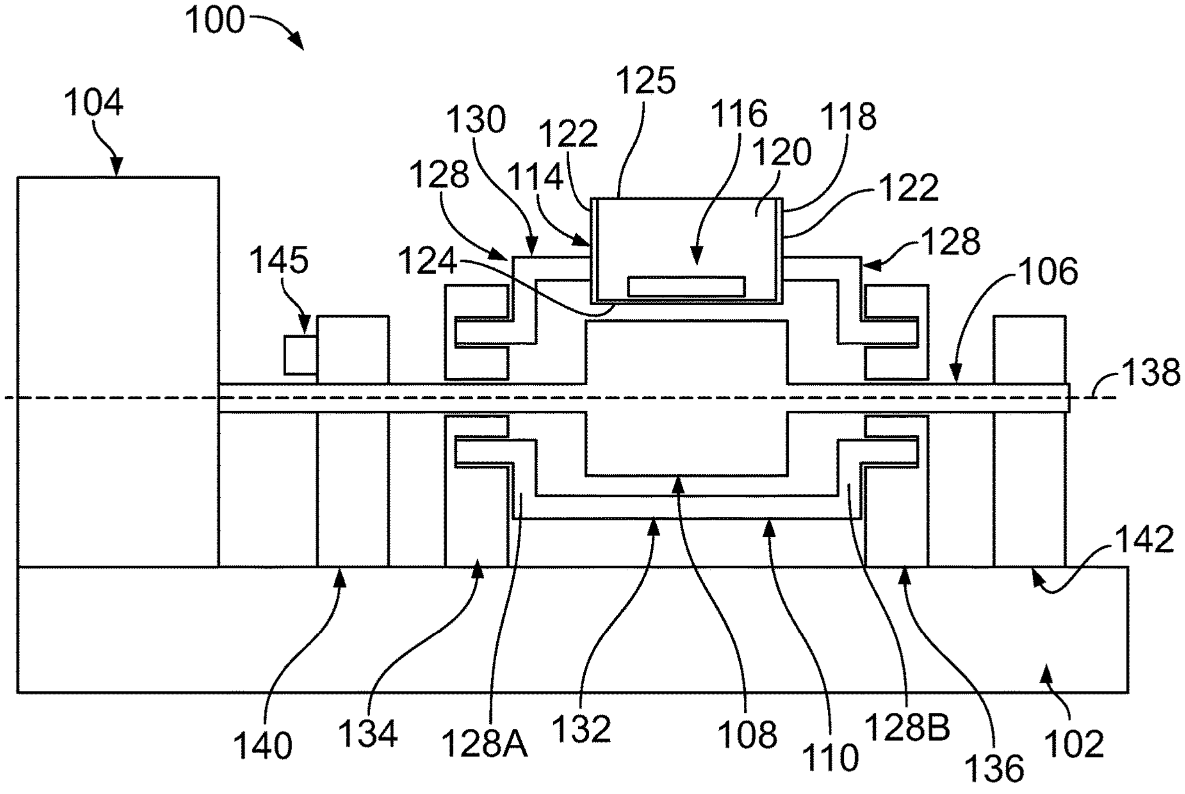
FIG. 2 illustrates a schematic front view of the measurement apparatus of FIG. 1.
Figure 3:
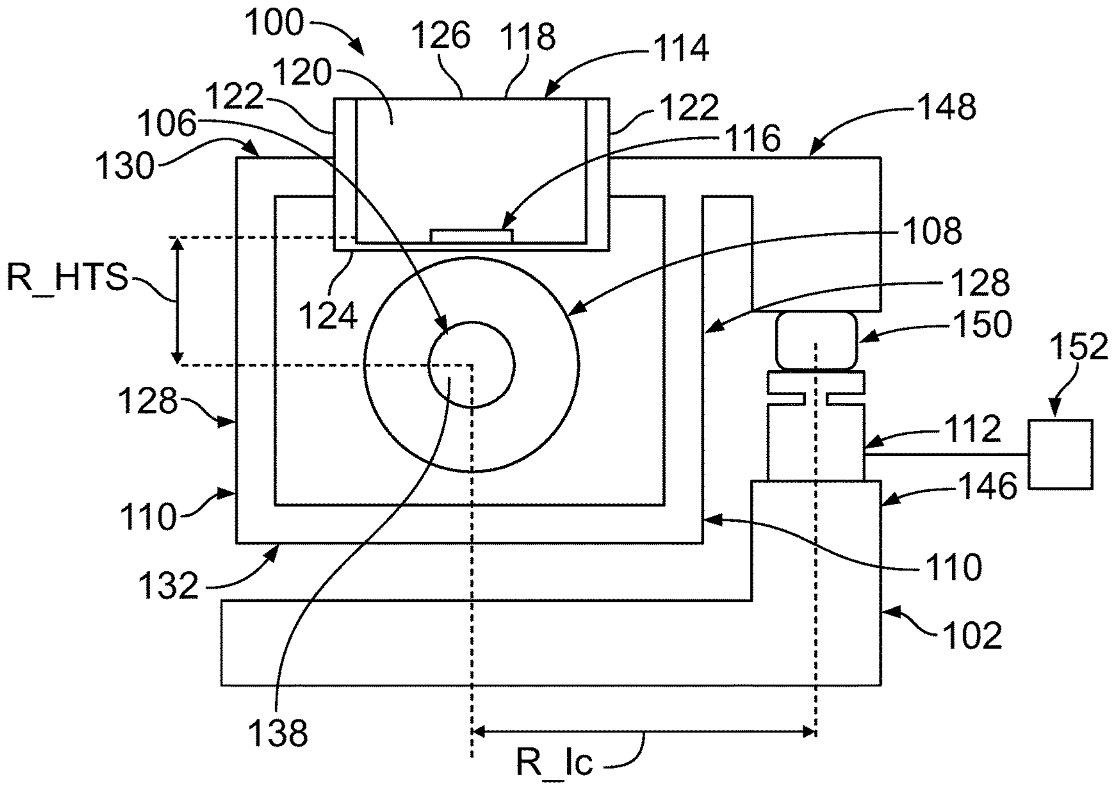
FIG. 3 illustrates a schematic side view of the measuring apparatus of FIG. 1.

As shown in FIGS. 1-3, the measurement apparatus 100 is mounted on a rig base or platform 102. The measurement apparatus 100 may include a motor 104, a shaft 106, a rotor 108, a frame or cradle 110, a sensor device 112, and a sample holder or container 114. The sample holder 114 of the measurement apparatus 100 may be configured to hold and/or support a HTS sample 116. The sample holder 114 may include a cooling unit or device 118 for cooling the HTS sample 116. For example, the cooling unit 118 may be configured to maintain the temperature of the HTS sample 116 below a predetermined temperature. In some embodiments, the cooling unit 118 may include a coolant medium or agent for cooling the HTS sample 116 as further described below. In other embodiments, the sample holder 114 may include a crycooler having a cold head (not shown) configured to be thermally coupled to the HTS sample 116 to cool the HTS sample 116.

In the illustrated embodiment, the cooling unit 118 may include an outer case having thermal insulation properties. In some embodiments, the cooling unit 118 may include a square or rectangular shaped tank 120. The tank 120 may be constructed with fiberglass boards and include four side walls 122 and a bottom 124. In some embodiments, the tank 120 may include a top 125 to seal the tank 120 defining a cooling chamber therein. The side walls 122 and bottom 124 of the tank 120 may be constructed with 5-mm thick G10 fiberglass boards secured together using epoxy resin.

As shown in FIG. 2, the HTS sample 116 may be fixed or attached to the bottom 124 of the tank 120. The HTS sample 116 may be fasten to the bottom 124 of the tank 120 using tape, such as Kapton tape. In some embodiments, the bottom 124 of the tank 120 may comprise a sample bed or panel (not shown) to support the HTS sample 116. The sample bed may include a slot or groove to hold the HTS sample 116. For example, a 100-mm by 12-mm slot may be formed or machined in the sample bed of the tank 120. The thickness or distance between the bottom of the slot and the outer surface of the tank 120 may be about 1 mm to enable to the HTS sample 116 to be placed in close proximity to the rotor 108. In other embodiments, the HTS sample 116 may be pressed and held against the bottom 124 of the tank 120 using a non-metallic panel or plate. The non-metallic panel may be secured to the tank using clamps or screws. As such, the HTS sample 116 may be positioned between the panel and the bottom 124 of the tank 120.

In some embodiments, the tank 120 may include or hold a coolant or cooling agent for cooling the HTS sample 116 to a superconductor state. For example, the tank 120 may be filled or supplied with a cooling liquid, such as liquid nitrogen, helium, hydrogen, neon, oxygen, or any other cryogenic liquid or fluid. In some embodiments, the tank 120 may be filled or supplied with a liquid mixture, such as neon/nitrogen, for cooling the HTS sample 116. In other embodiments, the tank 120 may be filled with a cooling gas, such as helium gas. Further, in some embodiments, the HTS sample 116 may be cooled by a cooling source or device (not shown), such as a crycooler with a cold head. The cold head of the crycooler may be thermally coupled to the HTS sample 116 to cool the HTS sample 116 and/or to maintain the HTS sample 116 at an operating temperature.

As shown in FIG. 1, the tank 120 may be attached or coupled to the frame 110 of the measurement apparatus 100. The tank 120 may be positioned on the frame 110 to allow the HTS sample 116 to be placed at a predetermined distance from the rotor 108. In some embodiments, a linear stage assembly 126 may be used to attach or fasten the tank 120 to the frame 110. The linear stage assembly 126 may be fixed to the top or upper portion of the frame 110 and the tank 120 may be fixed to the linear stage assembly 126. In some embodiments, the linear stage assembly 126 may be a two-dimensional or a 3-axis linear stage assembly. The linear stage assembly 126 may be fabricated from aluminum or any other suitable material. The linear stage assembly 126 may establish or provide a rigid mechanical connection between the HTS sample 116 and the frame 110 so that when a magnetic field is applied to the HTS sample 116, the frame 110 rotates or pivot (or attempts to rotate or pivot) as further described below.

The frame 110 of the measurement apparatus 100 may be rectangular shaped having four sides 128, a top 130, and a bottom 132. In one embodiment, the frame 110 may be 600 mm long, 300 mm wide, and 345 mm tall. The frame 110 may be fabricated from aluminum or any other suitable material. When the frame 110 is constructed from a magnetic or conductive material, the sides 128, top 130, and bottom 132 of the frame 110 may be sufficiently spaced from the magnetic field generated by the rotor 108 to minimize the associated eddy-current loss in the frame 110. However, when the frame 110 is constructed from a non-magnetic or non-conductive material, portions of the frame 110 may be positioned within the magnetic field.

As shown in FIG. 2, the frame 110 may supported by two bearing journal assemblies 134 and 136 such that the frame 110 is free to rotate or pivot about an axis of rotation 138 with negligible friction or to move translationally as further described below. The bearing journal assemblies 134 and 136 may comprises an air-bearing system, a magnetic levitating bearing system, a superconducting bearing system or any other suitable bearing system to reduce friction. A gas source (not shown) may supply gas to the two bearing journal assemblies 134 and 136. The gas source may be air, nitrogen, or any other suitable gas.

Referring again to FIG. 1, the rotor 108 of the measurement apparatus 100 may be disposed within the frame 110 and may be rotated about the axis of rotation 138. When rotated, the rotor 108 may be configured to generate a magnetic field (e.g., an alternating magnetic field). The rotor 108 may be a surface-mount permanent-magnet rotor, a superconductor rotor, or any other suitable rotor. In one embodiment, the rotor 108 may have a length (L) of 100 mm, a diameter (D) of 190 mm, and 9 pole-pairs (e.g., 18 permanent magnet arcs of alternating polarization or direction of magnetization). As a result, one revolution of the rotor 108 may correspond to 9 complete cycles of magnetic field alternation.

Figure 4:
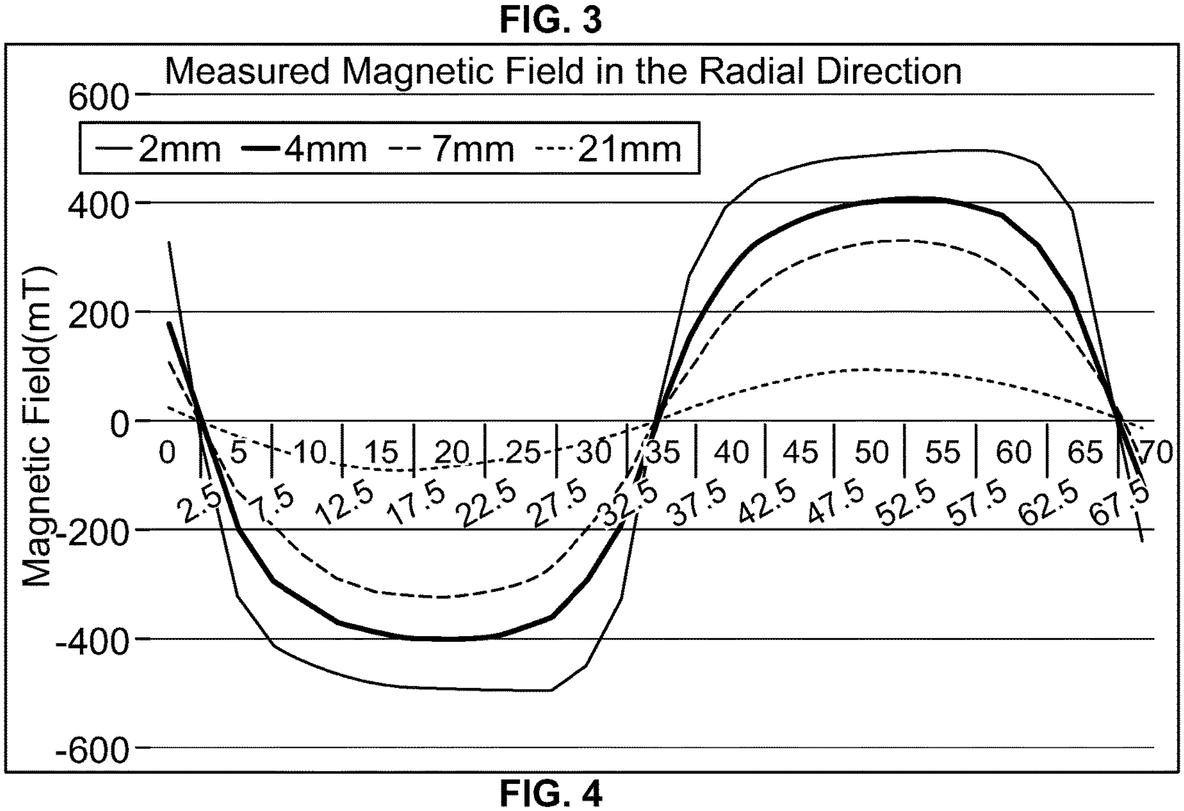
FIG. 4 is a depicts a graph of measured magnetic fields at various distances from a rotor of the measurement apparatus of FIG. 1.

The rotor 108 of the measurement apparatus 100 may generate a magnetic field with various peaks or field strengths at different distances from the rotor 108. The components of the magnetic field at different distances from the rotor 108 may be determined using a measuring device. The measuring device may include a gauss meter and a probe. In some embodiments, the measuring device may include a LakeShore 450 Gauss meter and a Lake Shore MMA-508-AG axial probe. In other embodiments, the measuring device may include a LakeShore MMA-2508-VG gauss meter. FIG. 4 shows a graph of the measured magnetic field (radial component) in the radial direction of the rotor 108, at different distances (e.g., 2 mm, 4 mm, 7 mm, and 21 mm) from the rotor surface. As shown, the magnetic field may have different field strengths at various distances away from the rotor 108.

As shown in FIG. 2, the HTS sample 116 may be positioned relative to the rotor 108 so that the components of the alternating magnetic field resembles an AC sinusoidal field at the HTS sample 116. The distance between rotor 108 and the HTS sample 116 may be adjusted or changed using the linear stage assembly 126. For example, the linear stage assembly 126 can enable the HTS sample 116 to be positioned at a predetermined distance relative to the rotor 108. As a result, the amplitude of the magnetic field generated by the rotating rotor 108 at the HTS sample 116 can be varied or changed so that the waveform of the magnetic field applied to the HTS sample 116 is approximately sinusoidal. As shown in FIG. 4, when the HTS sample 116 is placed close to the rotor (e.g., 2 mm), the magnetic field exerts on the HTS sample 116 is strong (500 mT) and resembles a square wave, which contains multiple harmonics. As the HTS sample 116 is moved away from the rotor (e.g., 21 mm), the AC magnetic field reduces in amplitude and its waveform substantially resembles a sinusoidal wave as shown in FIG. 4.

Referring again to FIG. 1, the rotor 108 may be mounted on the shaft 106 of the measurement apparatus 100. The shaft 106 may have a cylindrical cross-section and may be fabricated from metal or any other suitable material. The shaft 106 may extend through the sides 128A and 128B of the frame 110 of the measurement apparatus 100. The shaft 106 may be supported by two bearing journal assemblies 140 and 142. The bearing journal assemblies 140 and 142 may be ball-bearing journals or any other suitable bearing journal assembly. At one end, the shaft 106 may be coupled to and driven by the motor 104. The motor 104 may be mounted to the rig base 102 and may be configured to rotate the shaft 106. When the shaft 106 is rotated, the rotor 108 may rotate at the same speed as the shaft 106. In some embodiments, the motor 104 can drive the shaft 106 to cause the rotor 108 to rotate up to 3000 rpm. A rotation speed meter 145 may be mounted near the shaft 106 to monitor the speed of the rotor 108. A power source or motor controller (not shown) may be configured to energize or power the motor 104.

As shown in FIG. 3, the sensor device 112 of the measurement apparatus 100 is positioned or disposed on one side of the frame 110. The sensor device 112 may be mounted on a platform or arm 146 attached or coupled to the rig base 102. In some embodiments, the sensor device 112 may be mounted about 400 mm away from the axis of rotation 138 of the shaft 106. The sensor device 112 may include a load cell, such as a pressure or force transductor. For example, the sensor device 112 may include a Futek LSB200 load cell and an IPM650 load cell display.

An extension arm 148 may be coupled to side of the frame 110 of the measurement apparatus 100. The extension arm 148 may be fabricated from aluminum or any other suitable material. The extension arm 148 may be configured to apply a force to the sensor device 112 when a magnetic field is applied to the HTS sample 116 disposed in the tank 120. For example, the magnetic field applied to the HTS sample 116 may cause the frame 110 to rotate or pivot (or attempt to rotate or pivot) about the axis of rotation 138 and cause the extension arm 148 to apply pressure to the sensor device 112. In some embodiments, the frame 110 may have a counterbalance which may be adjusted to enable the extension arm 148 to apply a slight compression force to the sensor device 112, which may yield a DC offset in the output of the sensor device 112. The slight compression force ensures contact or engagement between the sensor device 112 and the extension arm 148 throughout the measurement process. As such, the force experienced by the HTS sample 116 due to the magnetic field can be transferred to the sensor device 112 via a rigid mechanical connection. Any force generated due to the AC losses may be superimposed or added to the DC offset as described above.

In some embodiments, an absorption material 150 may be positioned between the sensor device 112 and the extension arm 148 as shown in FIG. 3. The absorption material 150 may include a rubber cushion or any other suitable material. The absorption material 150 may reduce the jitter and/or vibration transferred from the motor 104 and rotating rotor 108 to the sensor device 112 via the frame 110. The sensor device 112 may be configured to output a signal indicative of the force applied to the sensor device 112 by the extension arm 148. The output of the sensor device 112 may send the signal to a computing device 152 associated with the measurement apparatus 100.

The computing device 152 may determine the AC losses of the HTS sample based on the output received from the sensor device 112. The computing device 152 may comprise one or more computers, control units, circuits, or the like, such as processing devices, that may include one or more microprocessors, microcontrollers, integrated circuits, and the like. The computing device 152 may also include memory, such as non-volatile memory, random access memory, and/or the like. The memory may include any suitable computer-readable media used for data storage. The computer-readable media may be configured to store information that may be interpreted or analyzed by the computing device 152. The information may be data or may take the form of computer-executable instructions, such as software applications, that cause a microprocessor or other such control unit within the computing device to perform certain functions and/or computer-implemented methods.

Once the computing device 152 receives the output signal from the sensor device 112, the computing device 152 may calculate the AC losses of the HTS sample 116. The AC losses per cycle $Q_{cycle}$ and the force experienced by the HTS sample $F_{HTS}$ are related by the following equation:

$$F_{HTS}R_{HTS}2\pi\frac{S_{RPM}}{60}=9\frac{S_{RPM}}{60}Q_{cycle} \tag{1}$$

where $R_{HTS}$ is the distance from the HTS sample 116 to the axis of the rotation 138 as shown in FIG. 3, $S_{RPM}$ is the speed of the rotor 108 in revolution-per-minute (RPM).

$F_{HTS}$ and $F_{lc}$, which is the force measured by the sensor device 112 (e.g., a load cell), are related by the equation:

$$F_{HTS}R_{HTS}=F_{lc}R_{lc} \tag{2}$$

where $R_{lc}$ is the horizontal distance between the sensor device 112 (e.g., a load cell) and the center of the rotor 108 as shown in FIG. 3.

Based on the equations above, the computing device 152 may calculate the AC losses of the HTS sample 116 using the following equation:

$$Q_{cycle}=F_{HTS}R_{HTS}2\pi/9 \tag{3}$$

where $R_{HTS}$ is the distance from the HTS sample 116 to the axis of the rotation 138 as shown in FIG. 3, and where $F_{HTS}$ is the force measured by the sensor device 112.

Figure 5:
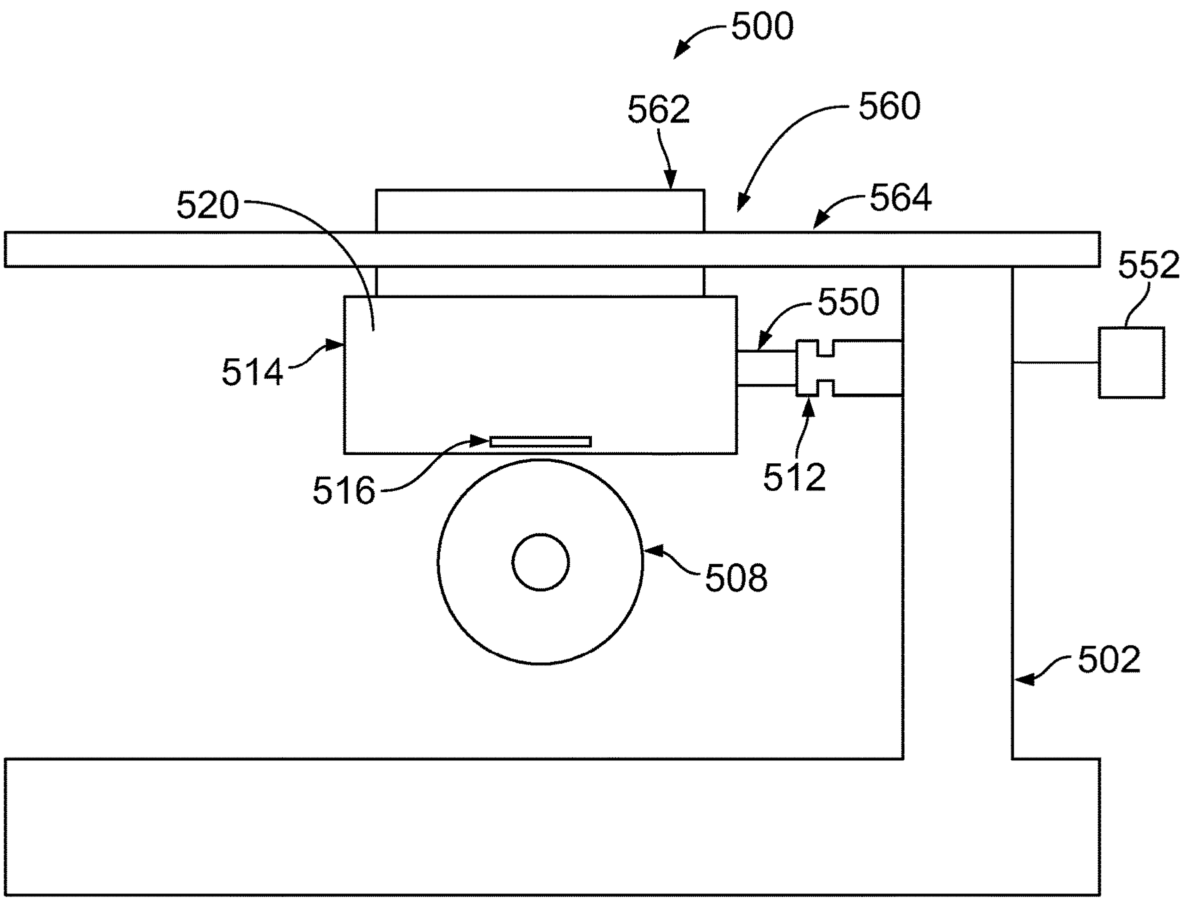
FIG. 5 illustrates a schematic side view of a measuring apparatus, according to another exemplary embodiment.

Referring now to FIG. 5, another exemplary embodiment of a measurement apparatus or system 500 for determining AC losses in HTS samples or structures is shown. The measurement apparatus 500 may measure the dragging force (e.g., torque) induced on the HTS samples by a magnetic field. The measurement apparatus 500 may use the dragging force measurement for determining the AC losses in the HTS samples as described above. The measurement apparatus 500 may, in many respects, correspond in construction and function to the previously described measurement apparatus of FIG. 1. Components of the measurement apparatus 500 which generally correspond to those components of the measurement apparatus 100 shown in FIGS. 1-3 are designated by like reference numbers in the seven-hundred series.

FIG. 5 illustrates a schematic side view of the measurement apparatus 500. The measurement apparatus 500 may include a linear rail assembly 560 instead of a frame or linear stage assembly as described above in reference to the measurement apparatus 100 shown in FIG. 1. The linear rail assembly 560 may be coupled to the rig base 502 and may include a movable element 562, which may be a movable stage or platform for carrying the tank 520. The movable element 562 may be configured to be moved in a linear direction across a predetermined distance using one or more bearings with negligible friction. As such, the movable element 562 may support, control, and move the tank 520 in a linear direction to allow the HTS sample 516 to be placed at a predetermined distance from the rotor 508.

The linear rail assembly 560 of the measurement apparatus 500 may include a plurality of bearings which are attached to and positioned under the movable element 562. The bearings may be air bearings, magnetic bearing, superconducting bearings, or any other suitable bearings. The linear rail assembly 560 may also include a rail member or guide rail 564 which runs in the direction of linear travel of the movable element 562. The bearings are configured to float with respect to the rail member in order to produce linear movement of the movable element 562 in the direction of the rail. The rail member 564 is generally rectangular and formed from an extruded material. However, it should be understood that the rail member 564 could have other configurations. The bearings may be porous media air bearings and may be connected to a pressurized gas source. The gas source may be air, nitrogen, or any other suitable gas. The rail and bearings of the linear rail assembly 560 may be available from New Way® Air Bearings, 50 McDonald Blvd Aston, Pa, 19014.

As shown in FIG. 5, the sensor device 512 of the measurement apparatus 500 is attached or coupled to the rig base 502. The tank 520 may be configured to apply a force to the sensor device 512 when a magnetic field is applied to the HTS sample 116 disposed in the sample holder 514 or tank 520. For example, the magnetic field applied to the HTS sample 516 may cause the tank 520 to move and apply pressure to the sensor device 512. As such, the force experienced by the HTS sample 516 due to the magnetic field can be transferred to the sensor device 512. In some embodiments, the absorption material 550 may be positioned between the sensor device 512 and the tank 520. The sensor device 512 may be configured to output a signal indicative of the force applied to the sensor device 512 by the tank 520. The output of the sensor device 512 may send the signal to the computing device 552 associated with the measurement apparatus 500. The computing device 552 may determine the AC losses of the HTS sample based on the output received from the sensor device 512 as described above.

Figure 6:
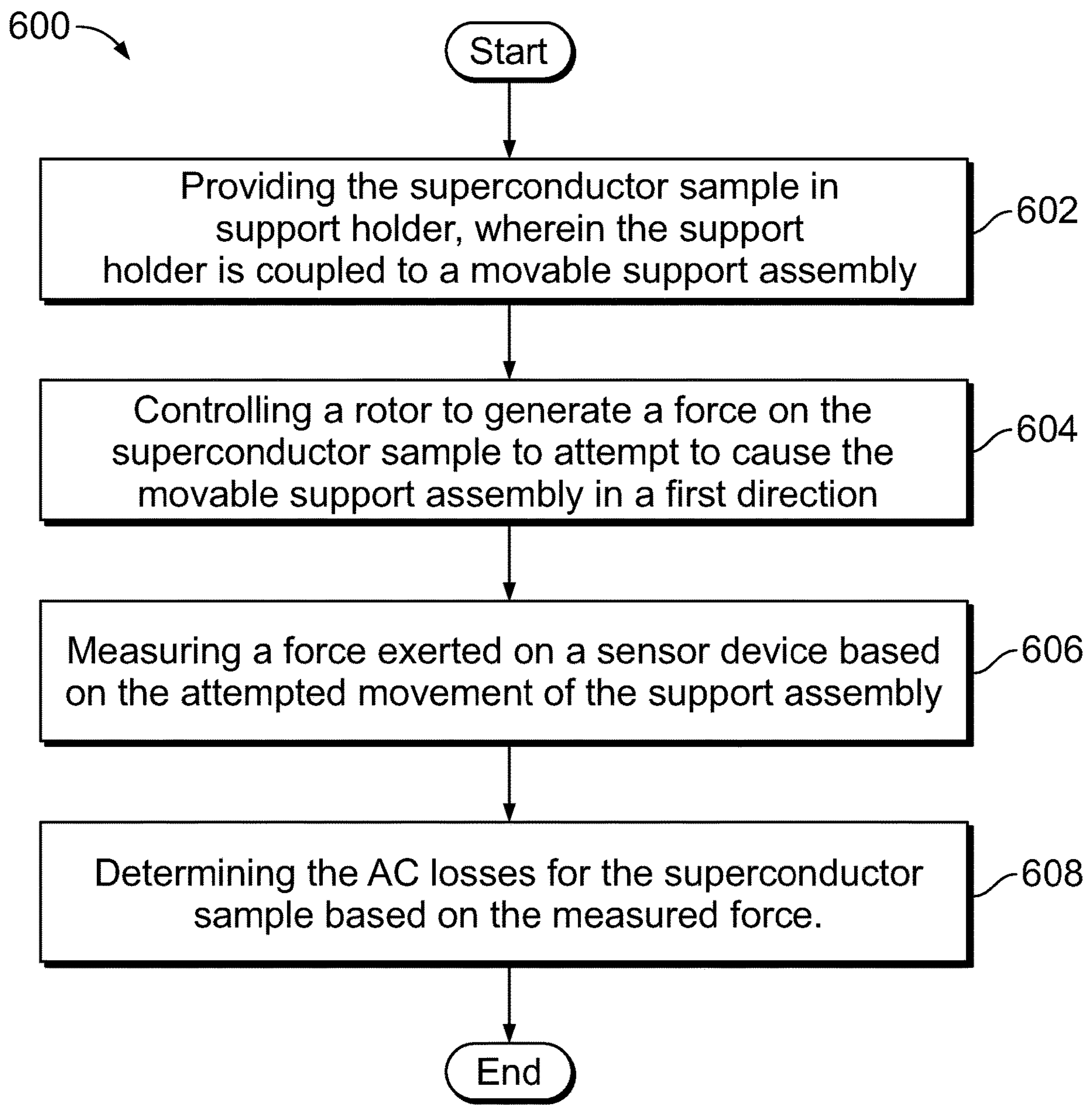
FIG. 6 is a flow chart of a method for determining AC losses in superconductor samples, according to an exemplary embodiment.

FIG. 6 illustrates a flow chart of a method 600 for determining alternating current (AC) losses in superconductor samples, according to an exemplary implementation. The method 600 may include one or more operations, functions, or actions, as depicted by one or more of blocks 602-608, each of which may be carried out by any of the systems, methods, or apparatus shown in figures, among other possible systems. Alternative implementations are included within the scope of the example implementations of the present application in which operations, functions, or actions may be executed out of order from that shown or discussed, including substantially concurrent or in reverse order, depending on the functionality involved, as would be understood by those reasonably skilled in the art.

The method 600 may begin at block 602. The method 600 may include providing the superconductor sample in sample holder, wherein the sample holder is coupled to a movable support assembly. The movable support assembly may include a rotatable frame of the measurement apparatus 100 of FIG. 1 or a movable support element of the measurement apparatus 500 of FIG. 5. For example, a HTS sample may be placed in a sample holder of a measurement apparatus, such the sample holder 114 of the measurement apparatus 100 of FIG. 1 or the tank 520 of the measurement apparatus 500 of FIG. 5. In some embodiments, a coolant may be added to the sample holder for cooling the HTS sample. In other embodiments, the HTS sample may be in thermal contact with a cold head of a crycooler.

At block 604, the method may include controlling a rotor to generate a force on the superconductor sample to attempt to cause the support assembly to move in a first direction. For example, a rotor may be rotated about an axis to generate a magnetic field. The rotor may be mounted on a shaft and the shaft may be rotated by a motor causing the rotor to rotate. The HTS sample may be positioned at a predetermined distance from the rotor. When the magnetic field is generated by the rotating rotor and the HTS sample 116 is exposed to the magnetic field, the support assembly may move (or attempt to move) or rotate or pivot (or attempt to rotate or pivot) about an axis of rotation. The support assembly may include the rotatable frame of the measurement apparatus 100 of FIG. 1 or the movable support element of the measurement apparatus 500 of FIG. 5.

At block 606, the method may include measuring a force exerted on a sensor device based on the attempted movement of the support member. When a magnetic field is applied to the HTS sample disposed within the sample holder, the support assembly may move (or attempt to move) or rotate or pivot (or attempt to rotate or pivot) about the axis of rotation. A sensor device (e.g., a load cell) may be configured to measure the force applied to the sensor device as a result of the movement (or attempted movement) of the support assembly.

At block 608, the method may include determining the AC losses for the superconductor sample based on the measured force. A computing device, such as the computing device described above, may determine the AC losses in the superconductor sample based on an output signal from a sensor device as a result of the movement (or attempted movement) of the support assembly. The output signal may be indicative of the force applied to the sensor device. The AC losses may be determined based on the force applied to the sensor device. In some embodiments, the AC loss may also be determined based on a distance between the axis of rotation of the support assembly and the HTS sample. For example, the computing device may calculate the AC losses using the following equation:

$$Q_{cycle} = F_{HTS} R_{HTS} 2\pi/9 \tag{4}$$

where $R_{HTS}$ is the distance from the HTS sample to the axis of the rotation, and where $F_{HTS}$ is the force measured by the sensor device (e.g., a load cell).

The AC losses of HTS samples determined by the measurement apparatus 100 may be compared to theoretical predictions or estimates based on a state model to verify accuracy. In one example, HTS tapes may be used as the HTS samples to verify the accuracy of the AC losses determined by the measurement apparatus 100 of FIG. 1.

For example, the HTS samples may include a Theva TPL1100 tape (e.g., Sample #1) and a Theva TPL 4600 tape (e.g., Sample #2). The parameters and/or characteristics of these samples are summarized in FIG. 7.

The resultant hysteresis loss may, in a thin superconductor strip in an AC magnetic field that is perpendicular to the wide side of the strip, be predicted or estimated based on the Brandt Model. The Brandt Model may expressed as the following equation:

$$Q_h = \frac{2B_a^2}{\mu_0}\frac{\pi w}{2\beta d}\left(\frac{2}{\beta}\ln(\cosh\beta) - \tanh\beta\right) \quad (5)$$

where $Q_h$ is the hysteresis loss per unit volume in the superconductor layer per cycle, w is the stripe width, and d is the thickness. β is defined as the ratio of $B_a$, the amplitude of the normal field, and $B_d$, the characteristic field amplitude of the tape, which is equal to $\mu_0 J_c d/\pi$. $J_c$ is the critical current density of the superconductor layer. The equation 5 is based on the hysteresis loop that assumes the hysteresis loss per cycle to be frequency-independent. The equation 5 does not account for the frequency-dependent eddy-current loss in the metal sheath layer. For these measurements, the eddy-current loss is regarded to be small compared to the hysteresis loss and the contribution to AC losses by the component of the magnetic field that is parallel to the flat surface of the HTS sample is also small and negligible. Therefore, the hysteresis losses calculated by Equation 5 may be taken approximately as the overall estimate.

Figures 7, 8:
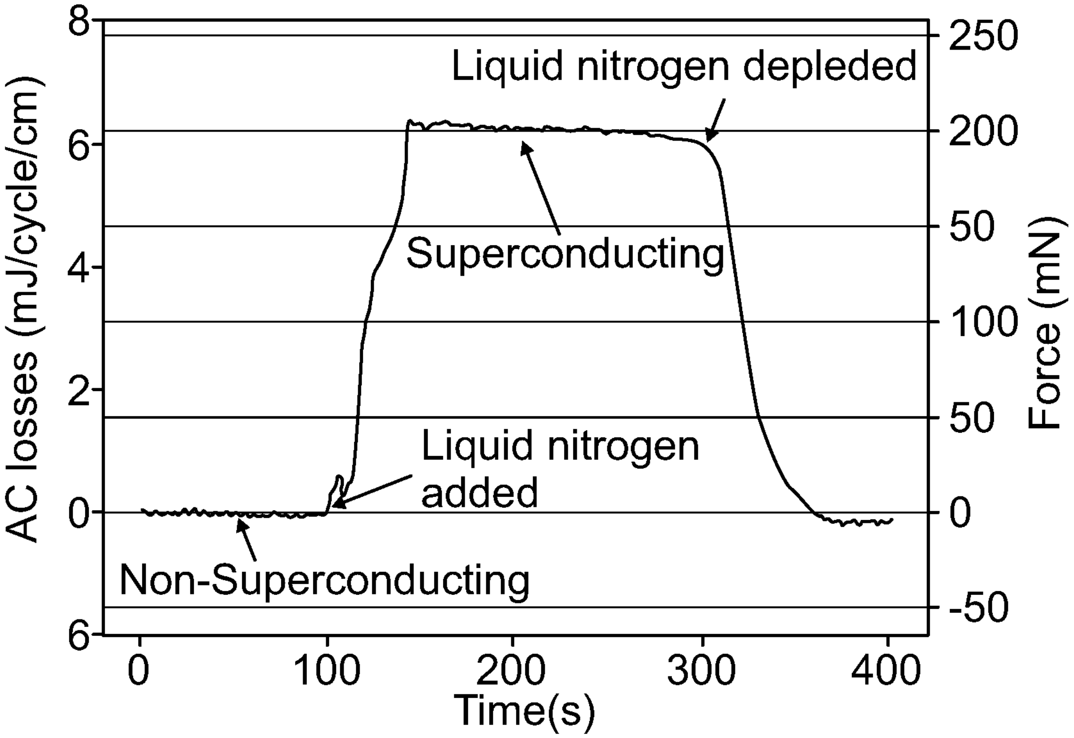
FIG. 7 is a diagram of a table of parameters of two HTS samples.
FIG. 8 is a graph of AC losses of a HTS sample.

The force measured on the sensor device or load cell (e.g., sensor device 112) and the calculated AC losses of Sample 1 are plotted as a function of time in FIG. 8, with the DC offset due to the pre-compression removed. The amplitude of the magnetic field is 150 mT and the rotational speed is 134 rpm which corresponds to an electrical frequency equal to 20 Hz. After liquid nitrogen is added into the liquid-nitrogen tank, the measured force increases rapidly. Thereafter, the HTS sample may cool and eventually transition from a non-superconducting state to a superconducting state. The sensor device (e.g., load-cell) reading and/or output stabilizes as the sample enters a fully superconducting state. The liquid nitrogen gradually depletes, due to the heat exchange with the ambient environment and the heat generated in the HTS sample. This gradually shifts the center of gravity of the support assembly (e.g., the frame 110 of measurement apparatus 100 of FIG. 1 or the linear rail assembly 560 of measurement apparatus 500 of FIG. 5) and causes a small decline in the measured force in the fully superconducting state. The reading or output of the sensor device at the end of the superconducting state is taken to calculate the AC losses using Equations 1-3 above. When the liquid nitrogen exhausts and the HTS sample warms up above the critical temperature, the HTS sample exits the superconducting state, and the reading or output of the senor device (e.g., load cell) returns to approximately zero. The measured AC losses are approximately 6.1 mJ/cycle/cm.

Figure 9:
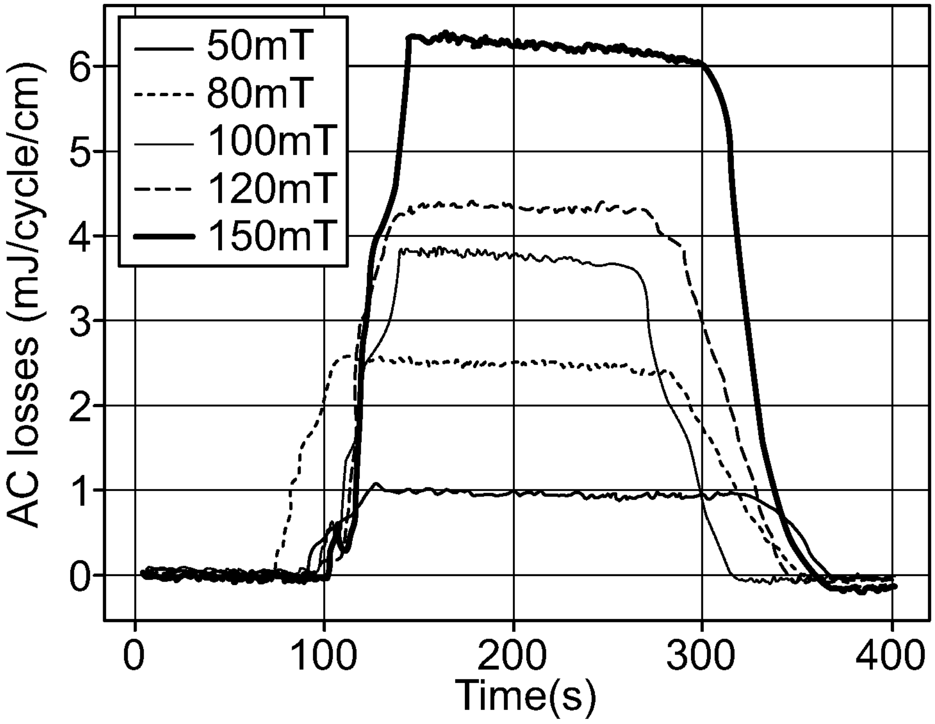
FIG. 9 is a graph of AC losses of a HTS sample due to different amplitudes of a magnetic field.
Figure 10:
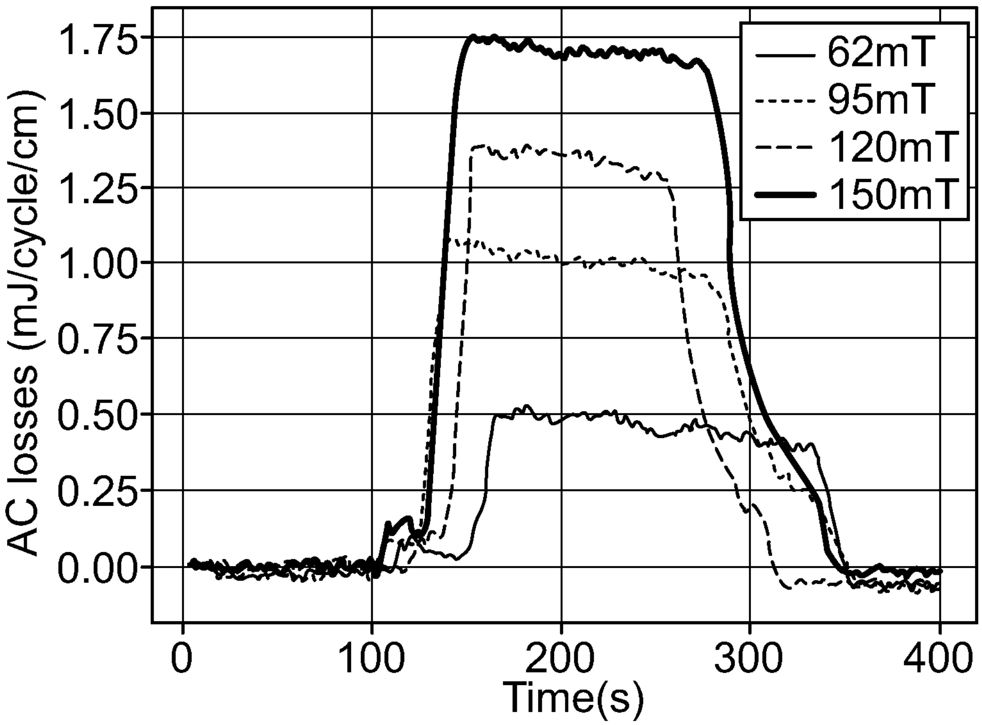
FIG. 10 is a graph of AC losses of another HTS sample due to different amplitudes of a magnetic field.
Figure 11:
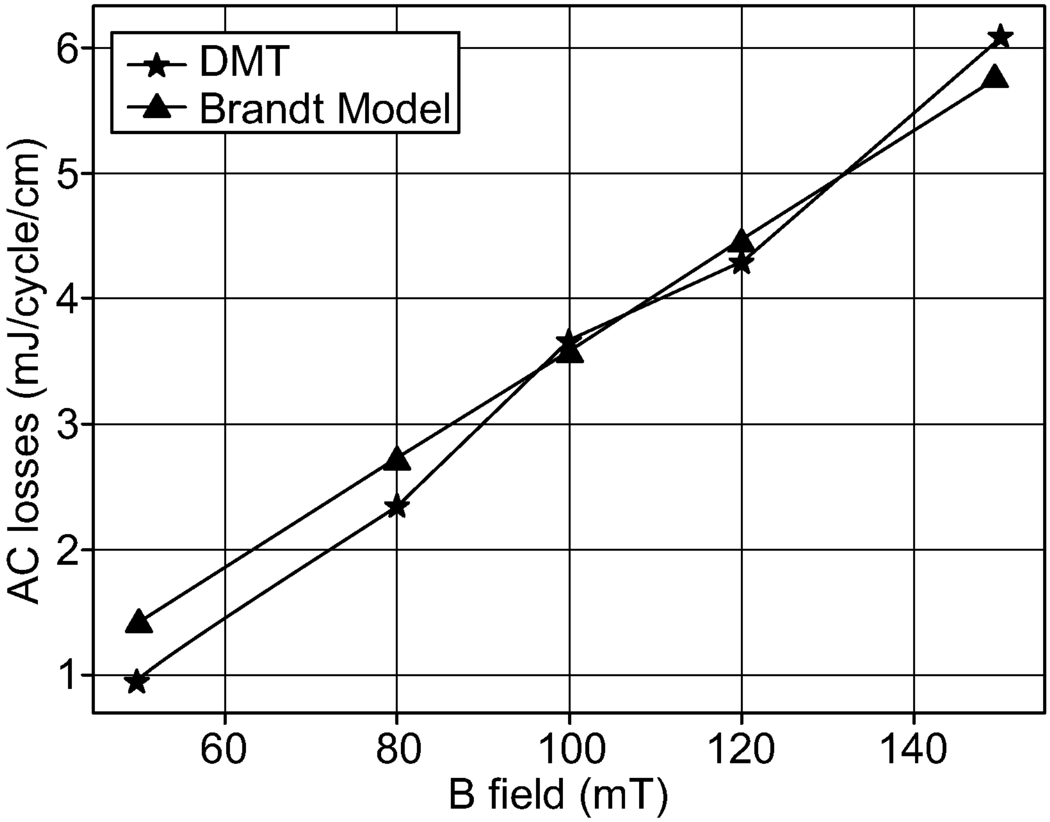
FIG. 11 is a graph of AC losses of a HTS sample compared to AC losses estimated by a state model.
Figure 12:
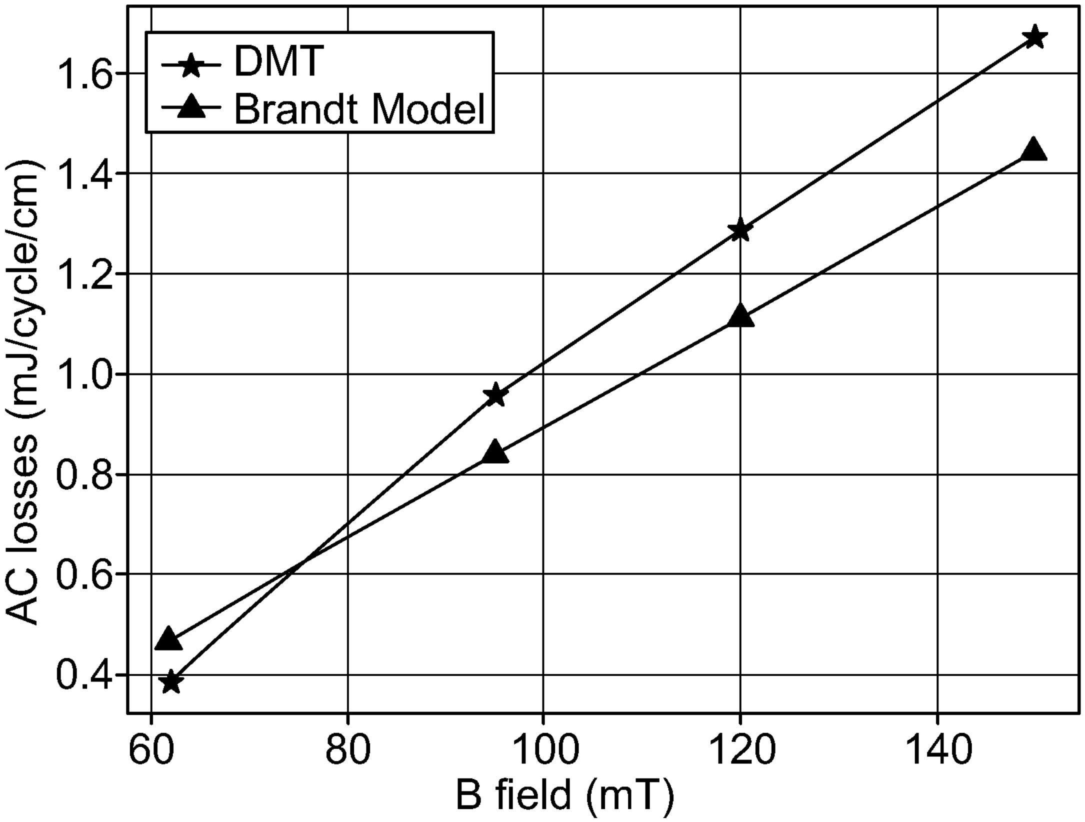
FIG. 12 is a graph of AC losses of another HTS sample compared to AC losses estimated by a state model.

The measurements can be repeated for both Sample 1 and Sample 2 with different field amplitudes, as shown in FIGS. 9 and 10, respectively. The electrical frequency is 20 Hz. For Sample 1, the AC losses increase from 1 mJ/cycle/cm to 6.1 mJ/cycle/cm when the magnetic field increases from 50 mT and 150 mT. For Sample 2, the AC losses increase from 0.4 mJ/cycle/cm to 1.7 mJ/cycle/cm when the magnetic field increases from 62 mT and 150 mT. The AC losses measured by a measuring apparatus (e.g., measurement apparatus 100) using a drag torque method (DTM) or technique (as described above) for both samples are also compared to the prediction by the Brandt Model described by Equation 5 and the results are shown in FIGS. 11 and 12, respectively. The measurements and theoretical prediction may be substantially similar, with the discrepancy being less than 20%. The discrepancy is likely due to the limitation of the Brandt model. It is also noted that the AC losses measured for Sample 2 are roughly 25% of the AC losses of Sample 1 by comparing FIGS. 6 and 7. This is consistent with Brandt Model as Equation 5 states that the hysteresis loss per unit volume per cycle is proportional to the square of the width of the HTS tape.

In summary, the present application relates to embodiments using a drag-torque technique for determining the AC losses in high-temperature superconductor (HTS) samples. The drag-torque technique may be simple to implement and significantly different from other methods such as electrical, magnetic, and calorimetric methods. The embodiments can be used to measure HTS samples of complex structures such as superconductor joints, Roebel cables, round core (CORC) cables, stacks of HTS tapes, and superconductor coils. The embodiments can aid in the development of new superconductor coil designs that minimize AC losses in superconductor machines.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

Additionally, instances in this specification where one element is “coupled” to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, “adjacent” does not necessarily denote contact. For example, one element can be adjacent another element without being in contact with that element.

As used herein, a system, apparatus, structure, article, element, component, or hardware “configured to” perform a specified function is indeed capable of performing the specified function without any alteration, rather than merely having potential to perform the specified function after further modification. In other words, the system, apparatus, structure, article, element, component, or hardware “configured to” perform a specified function is specifically selected, created, implemented, utilized, programmed, and/or designed for the purpose of performing the specified function. As used herein, “configured to” denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

While apparatus has been described with reference to certain examples, it will be understood by those skilled in the art that various changes can be made and equivalents can be substituted without departing from the scope of the claims. Therefore, it is intended that the present apparatus not be limited to the particular examples disclosed, but that the disclosed apparatus include all embodiments falling within the scope of the appended claims.

What is claimed is:

1. An apparatus for determining alternating current (AC) losses in a superconductor sample comprising:

a sample holder configured to hold the superconductor sample;

a frame configured to support the sample holder, wherein the frame includes a pair of spaced apart parallel walls, and wherein the frame is configured to rotate about an axis of rotation, wherein a measuring device measures a distance from the superconductor sample to the axis of the rotation, wherein the measuring device comprises one or more of a Gauss meter and a probe;

a rotor positioned between the pair of spaced apart parallel walls of the frame, wherein the rotor is configured to rotate about the axis of rotation to generate a magnetic field;

an extension arm coupled to the frame; and a sensor device configured to detect a force exerted on the sensor device by the extension arm, wherein the force experienced by the superconductor sample due to the magnetic field is transferred to the sensor device via a mechanical connection, and wherein the AC losses are based on the distance from the superconductor sample to the axis of the rotation and the force detected by the sensor device.

2. The apparatus of claim 1, wherein the superconductor sample comprises a superconductor tape, a superconductor coil, a superconductor film, a superconductor conductor, a superconductor wire, or a superconductor material.

3. The apparatus of claim 1, further comprising a motor configured to rotate a shaft about the axis of rotation, wherein the shaft extends through each of the spaced apart parallel walls, and wherein the rotor is mounted on the shaft between the spaced apart parallel walls.

4. The apparatus of claim 3, further comprising at least one bearing assembly configured to rotatably support the shaft.

5. The apparatus of claim 3, further comprising:

a first ball bearing assembly configured to rotatably support the shaft near one end of the shaft; and a second ball bearing assembly configured to rotatably support the shaft near the other end of the shaft.

6. The apparatus of claim 1, wherein the sample holder comprises a tank for immersing the superconductor sample in a coolant.

7. The apparatus of claim 6, wherein the coolant comprises nitrogen, helium, hydrogen, neon, or oxygen.

8. The apparatus of claim 1, further comprising a cryocooler having a cold head, wherein the cold head is thermally coupled to the superconductor sample.

9. The apparatus of claim 6, wherein the sample holder further comprises a linear stage assembly coupled to the frame and the tank, and wherein the linear stage assembly is configured to position the superconductor sample at one or more predetermined distances from the rotor.

10. The apparatus of claim 1, wherein the frame is configured to pivot or rotate about the axis of rotation when the magnetic field generated by the rotor is applied to the superconductor sample.

11. The apparatus of claim 10, further comprising:

a first bearing assembly configured to rotatably support one of the spaced apart parallel walls; and a second bearing assembly configured to rotatably support the other of the spaced apart parallel walls, wherein the first bearing assembly and the second bearing assembly are configured to be coupled to a gas or air source.

12. The apparatus of claim 1, further comprising an absorption material disposed between the extension arm and the sensor device.

13. The apparatus of claim 1, wherein the sensor device comprises a pressure or force transducer, and wherein the rotor comprises a permanent magnetic rotor or a superconductor rotor.

14. The apparatus of claim 1, wherein the sensor device is configured to generate a signal indicative of the force applied to the sensor device by the extension arm, and the apparatus further comprising a computing device configured to determine the AC losses in the superconductor sample.

15. A method for determining alternating current (AC) losses in a superconductor sample comprising:

providing the superconductor sample in sample holder, wherein the sample holder is coupled to a movable support assembly, wherein the movable support assembly includes a frame configured to support the sample holder, wherein the frame includes a pair of spaced apart parallel walls, and wherein the frame is configured to rotate about an axis of rotation, wherein a measuring device measures a distance from the superconductor sample to the axis of the rotation, wherein the measuring device comprises a Gauss meter;

controlling a rotor to generate a force on the superconductor sample to attempt to cause the movable support assembly to move in a first direction;

measuring a force exerted on a sensor device based on the attempt to cause the movable support assembly to move; and determining the AC losses for the superconductor sample based on the force, wherein the force experienced by the superconductor sample due to a magnetic field is transferred to the sensor device via a mechanical connection, and wherein the AC losses are based on the distance from the superconductor sample to the axis of the rotation and the force detected by the sensor device.

16. The method of claim 15, wherein the superconductor sample comprises a superconductor tape, a superconductor coil, a superconductor film, a superconductor conductor, a superconductor wire, or a superconductor material.

17. The method of claim 15, wherein a magnetic field is generated by a rotating rotor, wherein the rotating rotor rotates about an axis of rotation, and wherein the support assembly rotates or attempts to rotate about the axis of rotation when the magnetic field is applied to the superconductor sample.

18. The method of claim 17, wherein the AC losses are determined based on at least the force and a distance between the axis of rotation and the superconductor sample.

19. The method of claim 17, wherein the sample holder comprises a tank for immersing the superconductor sample in a coolant.

20. A method for determining alternating current (AC) losses in a superconductor sample comprising:

providing a frame supported by two bearing journal assemblies, wherein the frame is configured to rotate about an axis of rotation, wherein a measuring device measures a distance from the superconductor sample to the axis of the rotation, wherein the measuring device comprises a Gauss meter;

attaching the superconductor sample to a tank, wherein the tank is coupled to the frame, and wherein the tank includes a cooling agent, controlling a rotor to generate a force on the superconductor sample to attempt to cause the frame to move in a first direction;

measuring a force exerted on a sensor device based on the attempted movement of the frame, wherein the sensor device is a load cell device; and determining the AC losses for the superconductor sample based on the force, wherein the force experienced by the superconductor sample due to a magnetic field is transferred to the sensor device via a mechanical connection, and wherein the AC losses are based on the distance from the superconductor sample to the axis of the rotation and the force detected by the sensor device.

* * * * *